United States Patent [19]

Wilson

[11] Patent Number: 5,504,472
[45] Date of Patent: Apr. 2, 1996

[54] VEHICLE DECELERATION WARNING LIGHT

[76] Inventor: Joseph G. Wilson, 24 Highland Ave., Rumson, N.J. 07760

[21] Appl. No.: 342,851

[22] Filed: Nov. 21, 1994

[51] Int. Cl.$^6$ .................................................. B60Q 1/44
[52] U.S. Cl. ........................ 340/479; 340/467; 340/464; 200/61.29
[58] Field of Search .................................. 340/479, 467, 340/463, 464, 468, 469; 200/61.29, 61.89

[56] References Cited

U.S. PATENT DOCUMENTS

| | | | |
|---|---|---|---|
| 3,693,151 | 9/1972 | Hasegawa et al. | 340/479 |
| 3,708,782 | 1/1973 | Mori . | |
| 3,827,522 | 8/1974 | Krause . | |
| 3,875,559 | 4/1975 | Szekessy | 340/479 |
| 3,939,316 | 2/1976 | Stropkay . | |
| 3,952,284 | 4/1976 | Martin | 340/479 |
| 4,231,013 | 10/1980 | Freeman et al. . | |
| 4,823,109 | 4/1989 | Boyer | 340/479 |
| 4,920,330 | 4/1990 | Plozner . | |
| 5,150,098 | 9/1992 | Rakow . | |

*Primary Examiner*—Brent A. Swarthout
*Assistant Examiner*—Nina Tong
*Attorney, Agent, or Firm*—Michael I. Kroll

[57] ABSTRACT

A vehicle deceleration warning light is disclosed that includes a pressure switch in fluid communication with the master hydraulic brake cylinder. When the pressure reaches a predetermined level that is representative of panic or emergency braking, the pressure switch activates a delayed and latched switch that, after a suitable interval, turns on a contrastingly colored flashing warning indicator on the rear deck of the motor vehicle to warn a following driver of the rapid deceleration. The flashing indicator continues its flashing for a predetermined amount of time, even after the pressure on the pedal has been released.

1 Claim, 2 Drawing Sheets

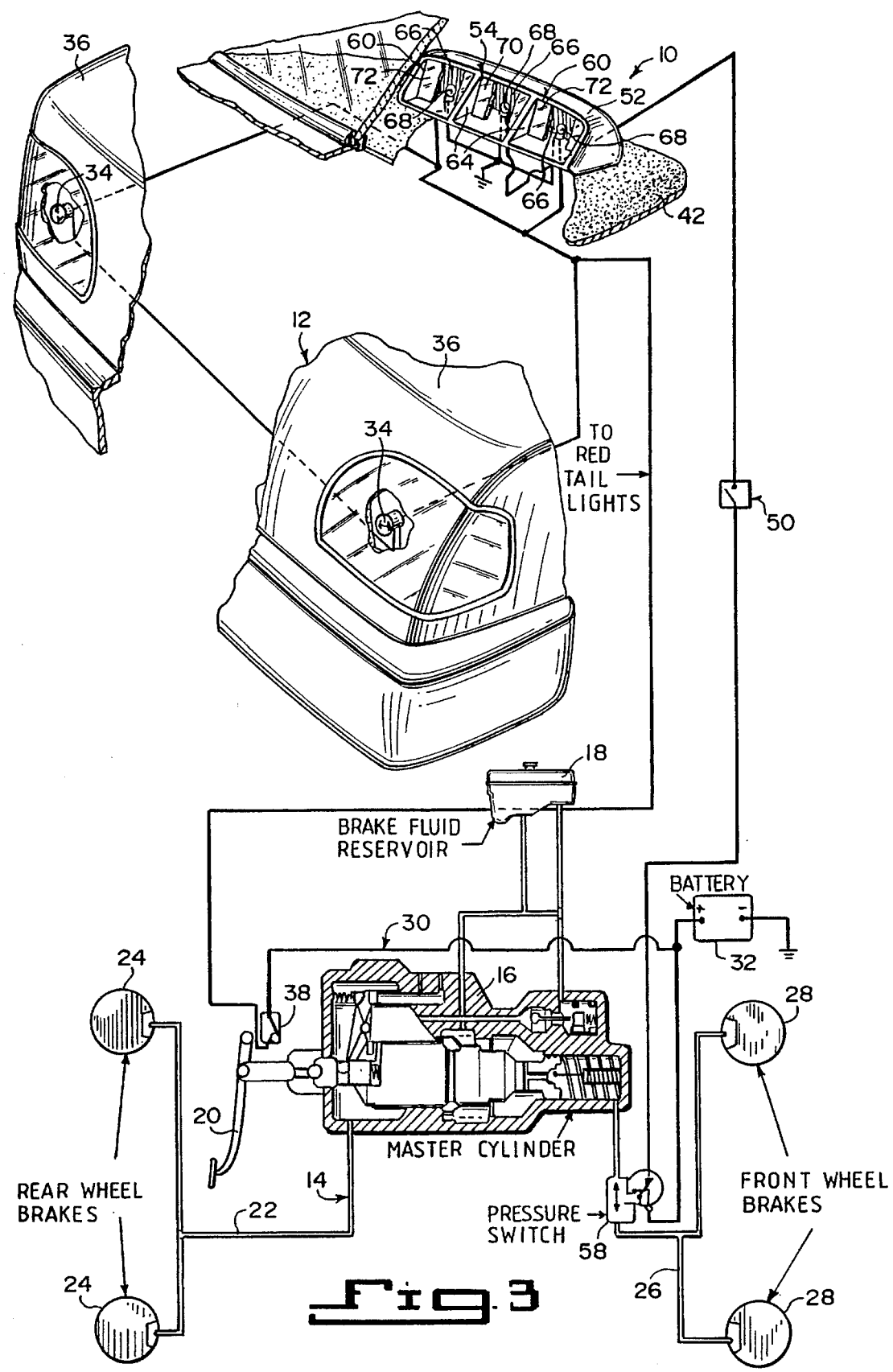

VEHICLE DECELERATION WARNING LIGHT

REFERENCE TO RELATED APPLICATIONS

This application is related to Ser. No. 07/865,935 filed on Apr. 9, 1992.

BACKGROUND OF THE INVENTION

1. Field of the Invention

The present invention relates generally to motor vehicle brake lights and more specifically it relates to an emergency deceleration warning light device. Even more specifically, it relates to an emergency brake light device that responds to the pressure within the brake cylinder and, when a predetermined threshold has been reached, activates a time delay that in turn activates a flashing, distinctive light on the rear deck of the vehicle to warn a following driver that a large change in velocity is occurring. More generally, the present invention could be used in a wide variety of applications wherein the braking system has a hydraulic cylinder to transmit the brake pedal force to the various brake drums. The variously colored warning lights could be mounted on a motorcycle, for instance, or on myriad types of construction or earthmoving equipment.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Rear end collisions are one of the most common traffic incidents. Many of them are caused simply because the driver following a decelerating vehicle cannot gauge the amount of ΔV being dropped. The present invention is directed towards addressing this problem by providing a clear indication on the rear of the vehicle that a large amount of braking force is being applied, thus allowing the following driver to react. A number of U.S. Patents relate to this field and they are discussed hereinafter:

First is U.S. Pat. No. 3,708,782 issued on Jan. 2, 1973 to Takakazu Mori. This discloses an abrupt brake application indicator wherein a pair of switches, the first activated by minimal movement of the brake pedal and the second when a predetermined amount of movement or predetermined amount of hydraulic pressure, are activated in turn. A time threshold is maintained and the activation of the second switch is compared to this threshold. If the second switch activation falls within the threshold, a second lamp, increasing the brightness of the brake light, is turned on. Alternatively, a single filament lamp may be supplied with additional voltage or a flasher is activated. This is dissimilar from the present invention in that there is no showing of the contrasting color warning light that makes the present invention a more attention drawing warning system.

Next is U.S. Pat. No. 3,827,522 issued on Aug. 6, 1974 to Kenneth M. Krause. This discloses a fluid pressure actuated brake light switch wherein a piston and switch plunger activate the taillights of a vehicle whenever the pressure in a relief valve manifold of the hydraulic system exceeds a predetermined level. Unlike the present invention, there is no teaching of the time delay or the contrasting warning flasher coloring.

U.S. Pat. No. 3,939,316 issued on Feb. 17, 1976 to Edward J. Stropkay discloses a panic stoplight system with a fluid pressure switching device. In this device, the fluid pressure activates switches to flash warning lights. Controlling the bleed rate of the fluid out of the actuating chamber allows the warning lights to keep flashing even after the panic braking has stopped. This is clearly unlike the present invention in that there is no time delay before the warning lights are activated and neither is the contrasting color of the warning light disclosed.

Next is U.S. Pat. No. 4,231,013 issued on Oct. 28, 1980 to William H. Freeman et al. This is a vehicle brake light illumination system. The brightness of the brake light varies according to the pressure in the brake fluid line. This is unlike the present invention in that no timing delay is disclosed for the warning light.

U.S. Pat. No. 4,920,330 issued on Apr. 24, 1990 to Lisio Plozner discloses a mercury inertial transducer with a light emitting indicator. Though Plozner teaches a central light located on the rear deck of a motor vehicle that has a contrasting warning color, the light does not flash on and off as in the present invention, nor is a time delay taught.

Lastly, U.S. Pat. No. 5,150,098 issued on Sep. 22, 1992 to Robert Rakow discloses a brake signaling system. A sequential series of lights is taught, with the lights activated one after the other as the pressure within the hydraulic system increases. This is unlike the present invention in that there is no teaching of either the time delay, the flashing of the warning light when a large amount of pressure is applied to the brake, nor the contrasting color of the warning light.

None of the above inventions and patents, taken either singly or in combination, is seen to describe the instant invention as claimed.

SUMMARY OF THE INVENTION

Briefly, the invention comprises a pressure switch in fluid communication with the master hydraulic brake cylinder. When the pressure reaches a predetermined level that is representative of panic or emergency braking, the pressure switch activates a delay and timing relay that, after a suitable interval, turns on a contrasting flashing warning indicator on the rear deck of the motor vehicle to warn a following driver of the rapid deceleration.

Accordingly, it is a principal object of the invention to provide a new and improved emergency brake lighting system which overcomes the disadvantages of the prior art in a simple but effective manner.

It is a major object of this invention to provide a vehicle deceleration warning light that directs a flashing, distinctive, contrasting color to the rear of a motor vehicle when a large amount of pressure is applied to the brakes.

It is another object of the invention to provide a vehicle deceleration warning light wherein the indication of emergency braking is derived from monitoring the hydraulic pressure of the master cylinder.

It is another object of the invention to provide a vehicle deceleration warning light wherein a small time delay exists between the activation of the pressure monitoring switch and the flasher relay to prevent spurious energizing of the warning flasher.

Yet another object of the invention is to provide a vehicle deceleration warning light wherein the warning flasher is activated for a predetermined amount of time to caution drivers to the rear of the vehicle that recent deceleration has occurred.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 3 is a diagrammatic view of the present invention partly in perspective and partly in elevation, with parts broken away and in section, showing relevant portions of the hydraulics, the brake system, and the electrical circuitry.

DETAILED DESCRIPTION OF THE PREFERRED EMBODIMENT

Figure 1:
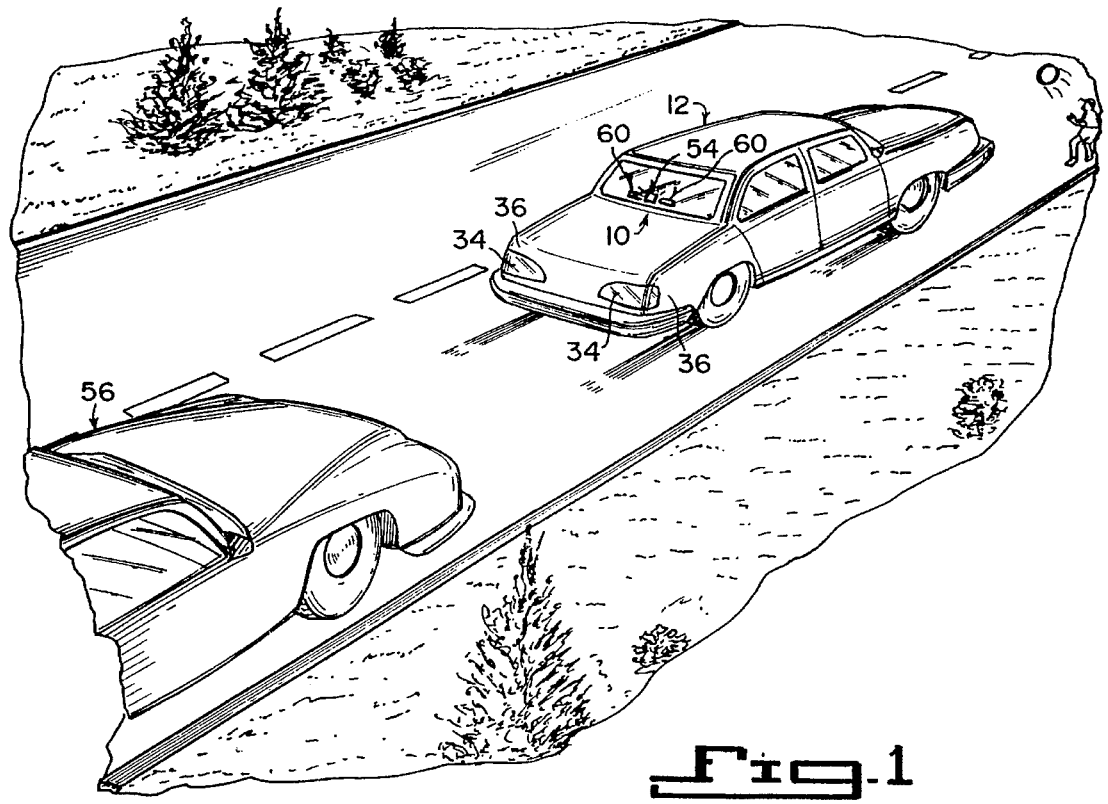
FIG. 1 is an environmental perspective view of the present invention installed in a motor vehicle and being used therein.
Figure 2:
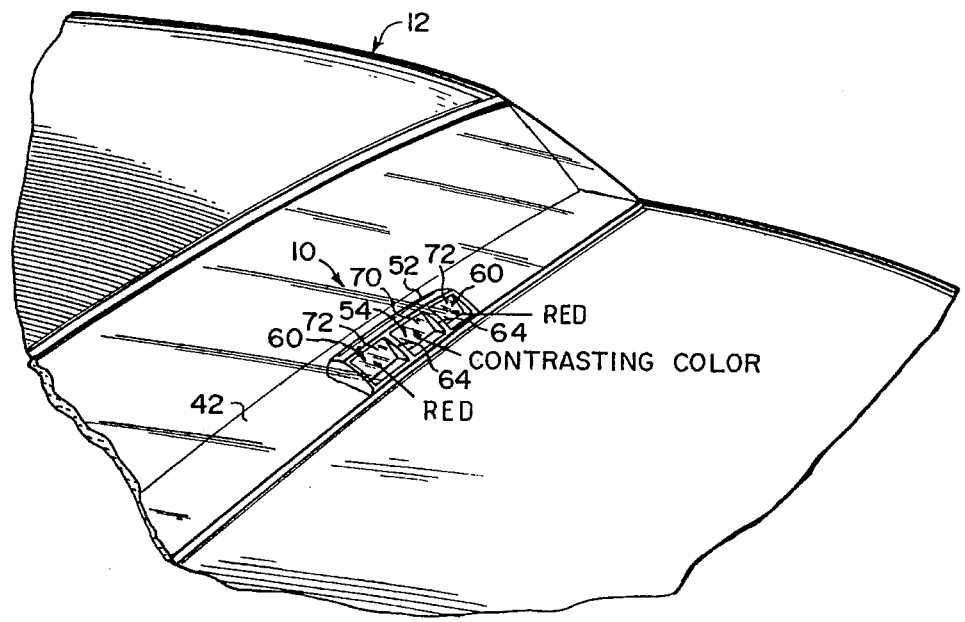
FIG. 2 is a partial enlarged perspective view of the rear deck of a motor vehicle showing the warning light assembly mounted thereon.

Turning to FIGS. 1 and 2, the emergency brake light indicator 10 is mounted on the rear deck 42 of a motor vehicle 12. The indicator 10 consists of a housing 52, made of a suitably strong material such as a polymer. The indicator 10 is similar in many respects to a conventional rear deck mounted brake light system, but the differences will be discussed further below.

Turning to FIG. 3, the discussion now turns to the overall operation of the instant invention. The vehicle 12 has a brake system that includes a master hydraulic cylinder 16. There is a brake fluid reservoir 18 connected to the cylinder 16. Additionally connected to the master cylinder 16 is a hydraulic pressure switch 58. This pressure switch 58 is adjusted such that when the pressure in the master cylinder 16 reaches or exceeds a predetermined level, a connection is closed between the battery 32 and the emergency brake light indicator 10, as will be discussed in more detail below. The vehicle 12 is equipped with the standard brake indication devices: tail lights 34 mounted proximate the rear 36 of the vehicle 12. These tail lights 34 are activated by a conventional switch 38 that is triggered by the movement of the brake pedal 20. Movement of the brake pedal 20 increases the pressure in the master cylinder 16 and thus provides hydraulic fluid pressure to the rear wheel brakes 24 through hydraulic line 22 and the front wheel brakes 28 through hydraulic line 26. Though the hydraulic pressure switch 58 is shown as being placed in or adjacent to hydraulic line 26, it should be understood that it could easily be placed in or adjacent to the hydraulic line 22, or could simply be tapped into master cylinder 16.

The discussion now turns to the operation of the present invention. As the driver (not shown) of the vehicle 12 brakes normally, the tail lights 34 are supplied with current from the battery 32 through activation of the switch 38. If, however, the brake is forcefully pressed, as would occur in an emergency situation, the hydraulic pressure in the master cylinder 16 would rise above the predetermined level that activates switch 58 and allows the signal to pass to the delayed switch and latched flasher unit 50. The delayed switch and latched flasher unit 50 firstly provides a delayed switch means that prevents activation of the emergency indicator 10 from a spurious or unintentional pressure spike in the hydraulic system. The switch is delayed from opening for a predetermined period of time (three tenths of a second, for example) until it allows power to flow to the indicator 10. Additionally, the switch 50 includes a latched flashing means that provides power to the emergency indicator 10 for a predetermined length of time (ten seconds, for example). This aids the drivers following the vehicle 12 in observing that an emergency deceleration has currently been made.

The discussion now turns to the details of the emergency indicator 10. As mentioned above, the indicator housing 52 is preferably made of a durable polymer material. There are three compartments 66 (shown in FIG. 3) within the housing 52 that each contain a light bulb 68. The bulbs 68 are preferably of the commonly available type similar to those in tail lights 34. Auxiliary tail light units 60 are located at distal ends of the housing 52. These auxiliary units 60 are wired to light along with the tail lights 34. Red tinted translucent sheeting 72 covers the bulbs 68 to form the auxiliary units 60. Lying between the two auxiliary tail light units 60 as defined by inner partitions 64 is a light bulb 68' that is connected to the delayed switch and latched flasher unit 50. The light 68' can be seen substantially throughout a 180 degree arc to the rear of the vehicle. There is a tinted translucent sheet 70 placed proximate the bulb 68' and facing the rear of the vehicle 12 that is a contrasting color from the sheets 72 and the tail lights 34. In the preferred embodiment, the color of this sheet 70 is blue. Thus, when the latched switch is activated, the bulb 68' flashes for a predetermined amount of time, and the driver in a following vehicle 56 is forewarned that force amounting to a panic or emergency stop has been applied to the brakes of the vehicle 12.

A list of reference numerals for the preferred embodiment of the present invention follows:

| | |
|---|---|
| 10 | emergency brake light indicator |
| 12 | motor vehicle |
| 52 | indicator housing |
| 16 | master hydraulic cylinder |
| 18 | brake fluid reservoir |
| 58 | hydraulic pressure switch |
| 32 | battery |
| 34 | tail lights |
| 36 | vehicle rear |
| 38 | conventional brake light switch |
| 20 | brake pedal |
| 24 | rear wheel brakes |
| 22 | first hydraulic line |
| 28 | front wheel brakes |
| 26 | second hydraulic line |
| 50 | delayed switch and latched flasher unit |

| | |
|---|---|
| 68 | light bulb |
| 60 | auxiliary tail light units |
| 72 | red tinted translucent sheeting |
| 64 | inner partitions |
| 68' | indicating bulb |
| 70 | tinted translucent sheet |
| 56 | following vehicle |

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. A vehicle deceleration warning system for motor vehicles having hydraulically powered brakes, brake lights activated by motion of a brake pedal, and electric power comprising:

hydraulic pressure sensing means for monitoring the amount of hydraulic pressure within a brake apparatus of a vehicle, said sensing means including signalling means, where said signalling means is activated if the hydraulic pressure in the brake apparatus exceeds a predetermined level;

a pair of taillights mounted on a rear deck proximate a rear windshield, and means for lighting said pair of taillights and said brake lights upon the application of normal pressure on the brake pedal;

visual warning means illuminated upon activation of the signalling means, directed towards the rear of the vehicle, said warning means comprises a third taillight, said third taillight is centrally mounted on the rear deck proximate the rear windshield, said third taillight being positioned between said pair of taillights, wherein said warning means being positioned on the vehicle such that said warning means can be seen substantially throughout a 180 degree arc to the rear of the vehicle;

signal delay means for delaying a signal received from said signalling means for a predetermined period of time;

latched switch means for energizing said visual warning means after the predetermined period of time set in said signal delay means has passed, said latched switch means energizing said visual warning means for a second predetermined period of time; which period would continue even after the hydraulic pressure no longer exceeded said predetermined level; whereby in an emergency braking maneuver where said pressure exceed said predetermined level is created in a hydraulic portion of the brake apparatus for longer than the predetermined period of time required by the signal delay means, said visual warning signal is displayed for said second predetermined period of time from the rear of the vehicle, such that operators of other vehicles behind the vehicle having a warning signal from said warning means are informed that a large amount of deceleration has occurred;

where said visual warning signal is a flashing light having a color contrasting visually from the brake lights.

\* \* \* \* \*